(12) United States Patent
Broadhurst

(10) Patent No.: US 10,142,398 B2
(45) Date of Patent: *Nov. 27, 2018

(54) METHOD AND SYSTEM FOR FILE TRANSFER OVER A MESSAGING INFRASTRUCTURE

(71) Applicant: International Business Machines Corporation, Armonk, NY (US)

(72) Inventor: Peter Andrew Broadhurst, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,743

(22) Filed: Nov. 21, 2017

(65) Prior Publication Data

US 2018/0097870 A1    Apr. 5, 2018

Related U.S. Application Data

(63) Continuation of application No. 15/263,344, filed on Sep. 12, 2016, now Pat. No. 9,860,299, which is a (Continued)

(30) Foreign Application Priority Data

Sep. 13, 2007  (EM) .................................... 07116308

(51) Int. Cl.
*H04L 29/08*   (2006.01)
*H04L 29/06*   (2006.01)
*G06F 17/30*   (2006.01)

(52) U.S. Cl.
CPC .............. *H04L 67/06* (2013.01); *H04L 63/12* (2013.01); *H04L 69/22* (2013.01);
(Continued)

(58) Field of Classification Search
CPC ....... H04L 63/12; H04L 63/123; H04L 67/06; G06F 17/30067
(Continued)

(56) References Cited

U.S. PATENT DOCUMENTS 5,621,890 A    4/1997  Notarianni et al.
6,446,235 B1   9/2002  Drottar et al.
(Continued)

OTHER PUBLICATIONS

Rivest, Ronald L. "The MD5 Message Digest Algorithm." MIT Lab for Computer Science, Apr. 1992.

*Primary Examiner* — James E Springer
(74) *Attorney, Agent, or Firm* — Steven M. Greenberg, Esq.; Shutts & Bowen LLP

(57) ABSTRACT

A method and system for file transfer over a messaging infrastructure are provided. The method includes dividing a file into multiple portions. The method includes generating for a current portion of a file, except for the first portion in a file, a first hash summarizing the state of the file up to, but not including, the current portion and a second hash summarizing the state of the file up to and including the current portion. The method includes sending the first and second hashes with the file portion. The second hash may be used at a target for comparing to a first hash of a subsequent file portion, for example, by recreating the second hash from the current state of the received file on the target.

19 Claims, 5 Drawing Sheets

Related U.S. Application Data continuation of application No. 12/013,527, filed on Jan. 14, 2008, now Pat. No. 9,521,186.

(52) U.S. Cl.
CPC ........ *G06F 17/30067* (2013.01); *H04L 63/00* (2013.01); *H04L 63/123* (2013.01)

(58) Field of Classification Search
USPC .......................................................... 709/246
See application file for complete search history.

(56) References Cited

U.S. PATENT DOCUMENTS

| | | |
|---|---|---|
| 6,850,962 B1 | 2/2005 | Povolny |
| 6,965,646 B1 | 11/2005 | Firestone |
| 7,020,664 B1 | 3/2006 | Yamaguchi et al. |
| 7,032,226 B1 | 4/2006 | Nemirovsky |
| 9,317,506 B2 | 4/2016 | Keith |
| 2001/0032311 A1 | 10/2001 | White |
| 2002/0037011 A1 | 3/2002 | Musoll |
| 2002/0080888 A1 | 6/2002 | Shu |
| 2002/0099798 A1 | 7/2002 | Fedorovsky et al. |
| 2003/0079041 A1 | 4/2003 | Parrella, Sr. |
| 2005/0235154 A1 | 10/2005 | Serret-Avila |
| 2005/0240550 A1 | 10/2005 | Armes et al. |
| 2005/0257106 A1* | 11/2005 | Luby .................... H03M 13/29 714/710 |
| 2005/0259613 A1 | 11/2005 | Garudadri |
| 2005/0273592 A1 | 12/2005 | Pryor et al. |
| 2006/0168147 A1 | 7/2006 | Inoue et al. |
| 2008/0010466 A1 | 1/2008 | Hopper |
| 2008/0037783 A1 | 2/2008 | Kim et al. |
| 2008/0130617 A1 | 6/2008 | Singh et al. |
| 2009/0024827 A1 | 1/2009 | Davis |
| 2009/0100125 A1 | 4/2009 | McDowell |
| 2010/0226342 A1 | 9/2010 | Colling et al. |
| 2012/0036190 A1 | 2/2012 | Samuels et al. |

* cited by examiner

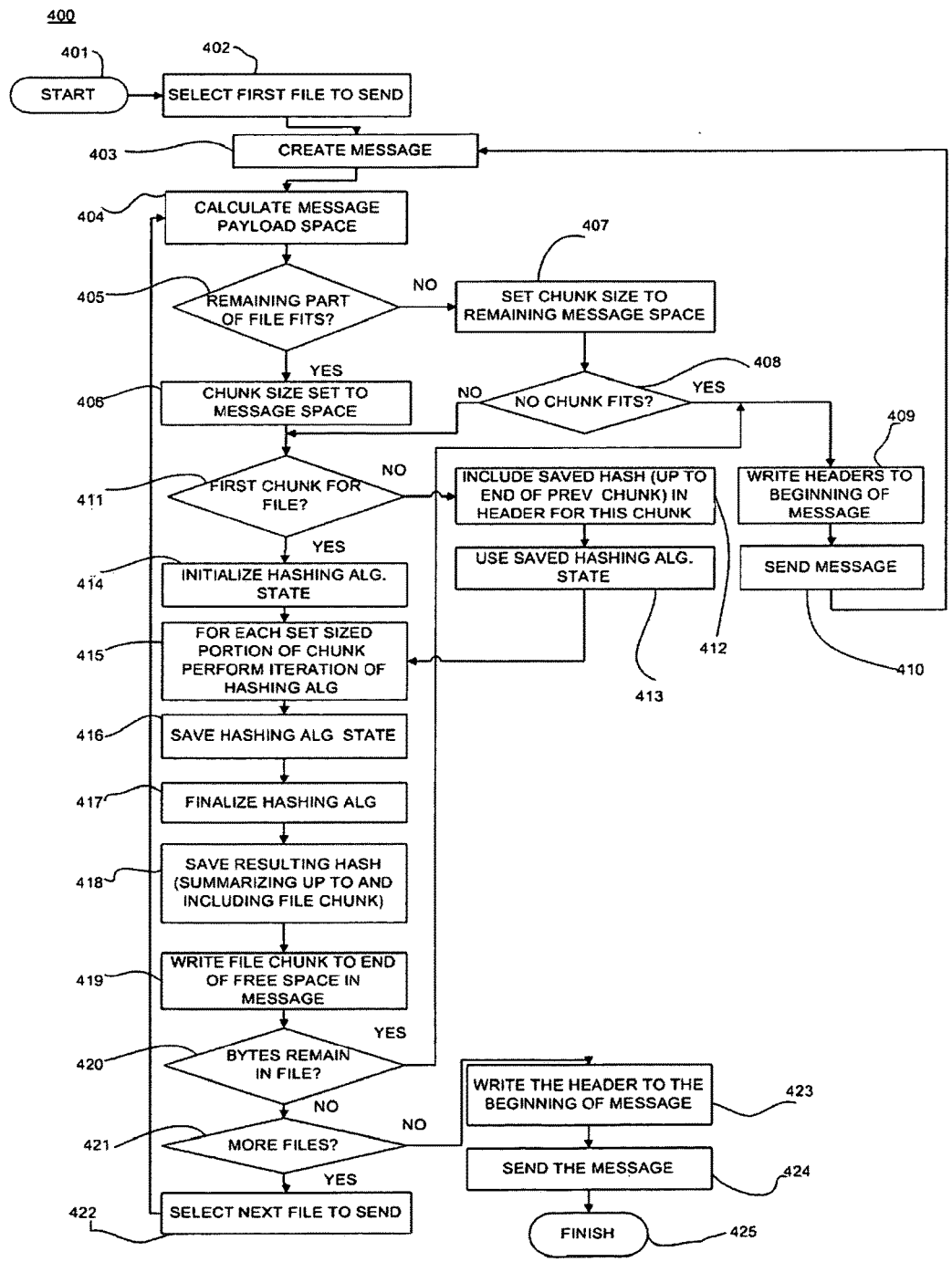

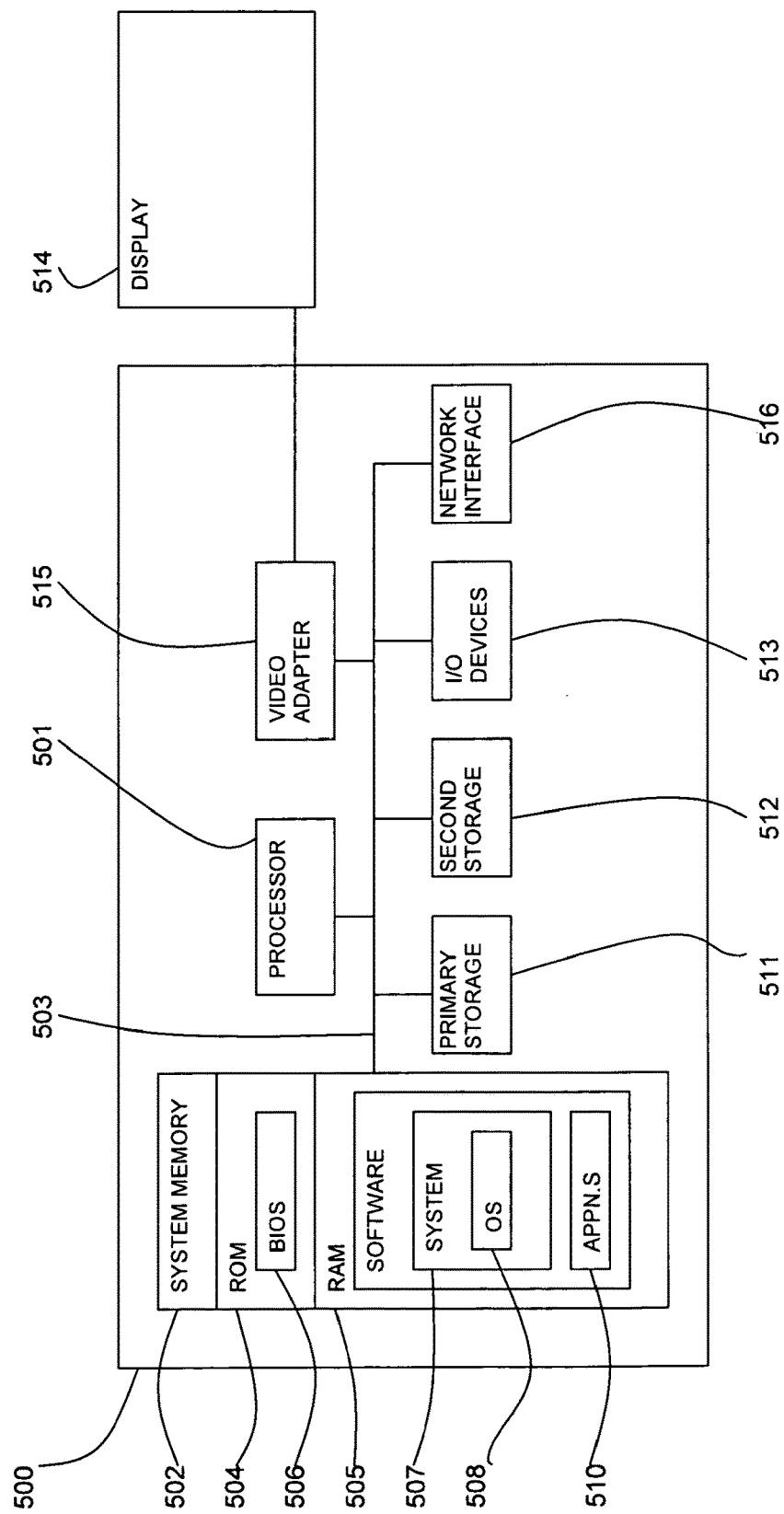

METHOD AND SYSTEM FOR FILE TRANSFER OVER A MESSAGING INFRASTRUCTURE

CROSS-REFERENCE TO RELATED APPLICATIONS

This application is a Continuation of U.S. patent application Ser. No. 15/263,344, filed Sep. 12, 2016, which is a Continuation of U.S. patent application Ser. No. 12/013,527, filed on Jan. 14, 2008, which claims priority to European Patent Application No. 07116308.3, filed Sep. 13, 2007, both of which are herein incorporated by reference.

FIELD OF THE INVENTION

This invention relates to the field of file transfer over a messaging infrastructure. In particular, it relates to file transfer with non-repudiation.

BACKGROUND OF THE INVENTION

Many computing actions require a file, containing a block of data, to be transferred between the file-system of one computer to the file-system of another computer.

There are a number of benefits of using a messaging infrastructure to perform this transfer, instead of via a direct network connection based mechanism such as the File Transfer Protocol (FTP). These include benefiting from the reliability and indirect routing provided by messaging infrastructure technologies, as well as the asynchronous nature of messaging which allows files to be placed into the messaging infrastructure for delivery whenever the target machine becomes available.

File transfer over a messaging infrastructure may involve transferring large numbers of files. Individually large files being transferred through a messaging infrastructure may be split into messages containing separate parts of a file.

Messages containing parts of an individual file may be delayed, for short or long amounts of time, or may arrive out of sequence. Messages containing parts of different files from multiple locations may also arrive concurrently on a single target queue.

These issues can be overcome using the following known approaches.

In a first existing approach, the complete file must arrive on a queue before writing it to the file system in the correct order using sequence numbers (or technology built into the messaging infrastructure). This has the disadvantage of requiring enough space on the target queue to contain the compete file. It can also delay availability of the file compared to writing the parts of the file as they arrive in messages.

In a second existing approach, separate state data is kept relating to the messages that arrive containing parts of a file, and the complete file is built from these messages in the correct order using this state data. This requires mechanisms to reliably persist this state data, for example, in a file, on a queue, or in a database. Updating this state data must also be carefully coordinated with writing to the file system, and complex logic may be required in the case of a failure or restart of the machine.

In addition, it may be a requirement to ensure non-repudiation of the file data and detection of any alteration of files during transit. It is known to use a hash function or message digest to ensure a block of data has not been tampered with accidentally or maliciously. A cryptographic hash function summarises an arbitrarily large quantity of data into a fixed size summary.

Existing uses of hash functions or message digests, take a single hash or digest of the data when it is known to be valid (i.e. at the source) and then pass the hash around with the data to ensure consistency.

Examples of known uses of a message digest include:
A signed email, where the hash is sent encrypted with the message, and hence ensures against tampering.
A hash sent with a packet of data traveling across a network connection protected by a cryptographic protocol, such as SSL (Secure Sockets Layer) or TLS (Transport Layer Security).
An HTTP/FTP (Hypertext Transfer Protocol/File Transfer Protocol) download of a file from the Internet, to check the final down loaded file has not been broken in transit. For example, a file may be broken into chunks and the chunks sent from A to B. The final re-assembled chunks are then checked against a hash taken at A for the entire file.

In the case of file transfer using a messaging infrastructure, non-repudiation can be ensured by gathering a hash or message digest of the complete file and sending it with the messages comprising that complete file. Once completely transferred, the hash or message digest can be gathered on the file on the file system and compared to that expected. This approach requires the complete file to be read back from disk after writing has been completed. This is a slow operation for a large file.

SUMMARY OF THE INVENTION

According to a first aspect of the present invention there is provided a method for file transfer over a messaging infrastructure, comprising: dividing a file into multiple portions; generating for a current portion of a file, except for the first portion in a file: a first hash summarizing the state of the file up to, but not including, the current portion; a second hash summarizing the state of the file up to and including the current portion; and sending the first and second hashes with the file portion.

According to a second aspect of the present invention there is provided a system for file transfer over a messaging infrastructure, comprising: a source for sending a file, including: means for dividing the file into multiple portions; means for generating for a current portion of a file, except for the first portion in a file: a first hash summarizing the state of the file up to, but not including, the current portion; a second hash summarizing the state of the file up to and including the current portion; and means for transferring the first and second hashes with the file portion to a target.

According to a third aspect of the present invention there is provided a computer program product stored on a computer readable storage medium, for a source transferring a file over a messaging infrastructure, comprising computer readable program code means for performing the steps of: dividing a file into multiple portions; generating for a current portion of a file, except for the first portion in a file: a first hash summarizing the state of the file up to, but not including, the current portion; a second hash summarizing the state of the file up to and including the current portion; and sending the first and second hashes with the file portion.

BRIEF DESCRIPTION OF THE DRAWINGS

Embodiments of the present invention will now be described, by way of examples only, with reference to the accompanying drawings in which:

FIG. 4 is a flow diagram of a method in accordance with the present invention; and FIG. 5 is a block diagram of a data processing system in which the present invention may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

A method and system of file transfer over a messaging infrastructure are provided. Files are transferred between the file system of one computer and the file system of a second computer by sending one or more messages, with each message including parts of a file, a single file, or multiple files. Messaging is a useful means of file transfer because of its reliability, its asynchronous nature, and indirect routing. An example messaging infrastructure is IBM's WebSphere MQ products (IBM, WebSphere and MQ are trade marks of International Business Machines Corporation).

Figure 1:
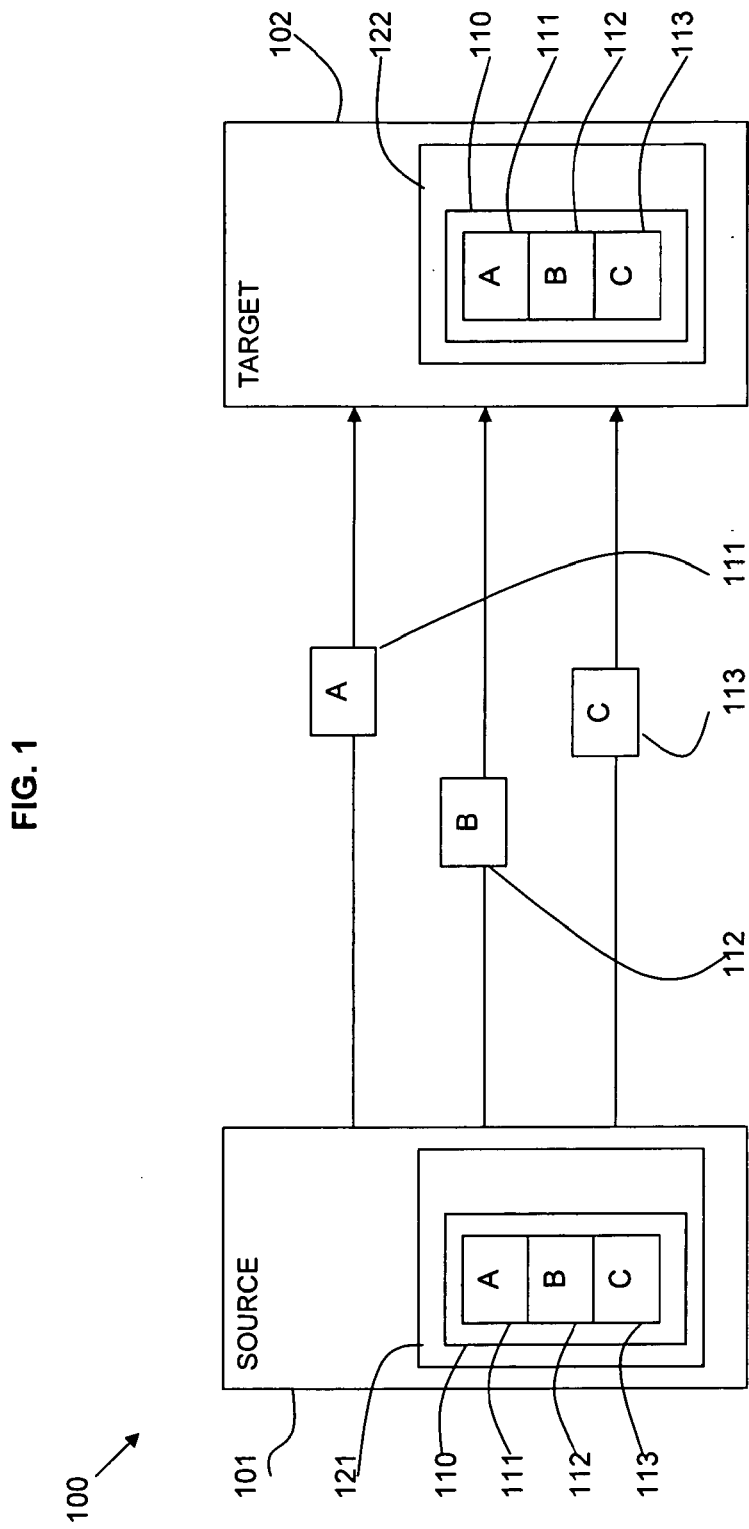
FIG. 1 is a block diagram of a messaging system in accordance with the present invention.

Referring to FIG. 1, a block diagram shows a messaging system 100 used for file transfer. A source 101 is provided from which the file 110 to be transferred originates, possibly held in a source file system 121. A target 102 is provided to which the file 110 is to be sent. The file 110 may be divided up into portions of data, often referred to as chunks 111-113. The chunks 111-113 are sent individually via the messaging infrastructure from the source 101 to the target 102.

Chunks 111-113 can arrive at any time and in any order. The chunks 111-113 may not arrive in the order they were sent, and chunks relating to different files may arrive concurrently. At the target 102, the chunks 111-113 are collected in a target file system 122 where they are put into the correct order.

The application writing data to the target 102 can fail at any point, and individual chunks 111-113 can be delayed for long periods. In a fire-and-forget messaging environment, it is not acceptable for a file transfer to fail or to lose, possibly critical, data. The sender cannot be contacted and asked to re-send, as it can with HTTP.

The described method and system combine file transfer over messaging with the use of a hash function, also known as a message digest, which is sent with each message to enable checking for any alteration to the files during transit.

A hash function is a reproducible method of turning data into a relatively small number that may serve as a digital "fingerprint" of the data. A hash function must be deterministic, i.e. if two hashes generated by some hash function are different, then the two inputs were statistically extremely likely to be different in some way.

In the described method, two hashes are sent with each chunk of a file being transferred. The first hash is a summary of the state the file needs to be in, in order to add this chunk to the file. For efficiency and double checking, the size of the file may also be sent. The second hash is a summary of the state the file should be in after adding the chunk. A hash of the whole file is only sent with the last chunk.

Figure 2A:
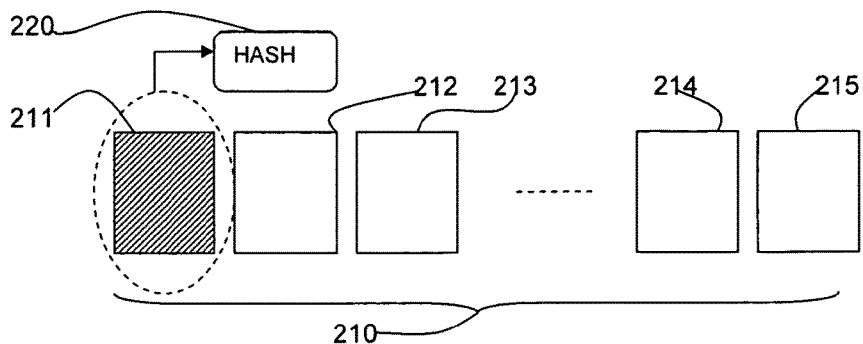
FIGS. 2A to 2C are schematic diagrams of chunks of a file to which hash functions are applied in accordance with the present invention.
Figure 2B:
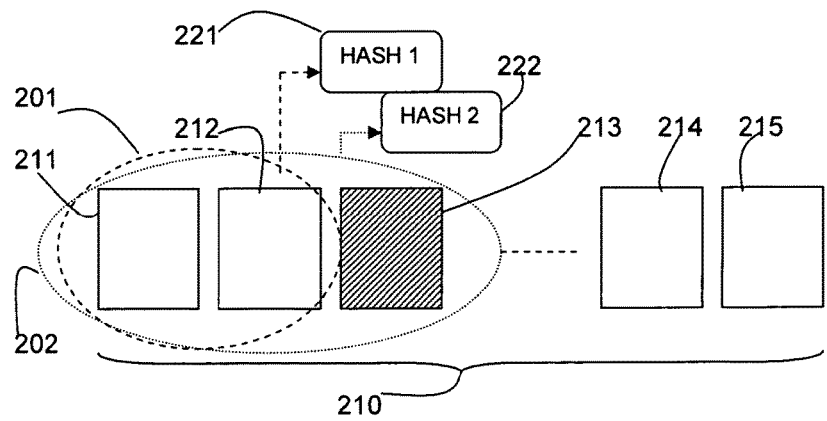
Figure 2C:
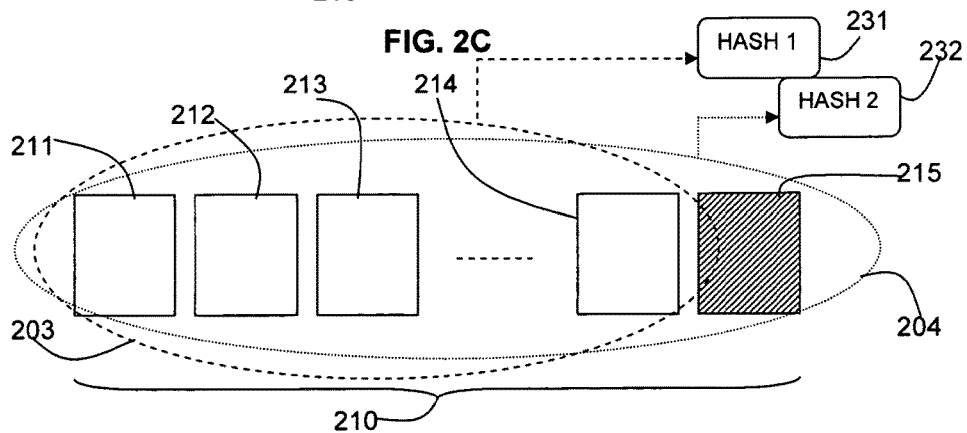

FIGS. 2A to 2C show schematically the chunks and the first and second hashes. FIG. 2A shows the hashes generated for the first chunk of data in the file, FIG. 2B shows the hashes generated for an intermediate chunk of data in a file, and FIG. 2C shows the hashes generated for the last chunk of data in a file.

FIGS. 2A to 2C show a file 210 which is divided into chunks 211-215 of data. In FIG. 2A, a hash is generated for a current chunk (shown with shading) which is the first chunk 111 of data in the file 200. As this is the first chunk 111 of data in the file 200, only one hash 220 is generated for the first chunk 111 of data.

In FIG. 2B, the hash functions are shown as generated for a current chunk, which in this example is the third chunk 213 of data. A first hash 221 is generated from the group 201 of chunks 211, 212 prior to the current chunk 213. A second hash 222 is generated from the group 202 of chunks 211, 212, 213 prior to and including the current chunk 213.

In FIG. 2C, the hash functions are shown as generated for a current chunk which in this example is the last chunk 215 of data in the file 200. A first hash 231 is generated from the group 203 of chunks 211-214 prior to the current chunk 215. A second hash 232 is generated from the group 204 of chunks 211-215 prior to and including the current chunk 215. As the current chunk 215 is the last chunk in the file 200, the second hash 232 is the hash of the entire file 200.

Only the file is required to be stored at the target. The second hash does not need to be stored at the target, as it can be recreated from the current state of the file on the target machine. The second hash may be cached in memory for performance, but does not need to be stored.

This means that failure at any point during normal processing does not affect the method. This is true as long as that failure does not corrupt data before the start of the chunk being written to the file at the point of failure. A failure which occurred while writing a previous chunk which results in an incorrect file size, or incomplete/incorrect data being written in the previous chunk, does not affect the hashing method.

The mechanism described could be implemented using one of various hash algorithms, as long as the algorithm involves updating state by performing operations against contiguous chunks in order, and finalising in a method that does not reference any previous chunk. Suitable cryptographic hash functions include MD5 and SHA (Secure Hash Algorithm).

As an example embodiment, the MD5 hash algorithm is used. The MD5 hash algorithm was published by Ronald L. Rivest of Massachusetts Institute of Technology in 1992 (see http://theory.lcs.mit.edu/~rivest/Rivest-MD5.txt).

The MD5 algorithm performs an identical set of operations on each 64 byte (512 bit) chunk of data, updating the state stored from the previous 64 bytes and initialised from constraints for the first chunk. The algorithm is then separately finalised. This involves adding padding to the end of the data, which includes the bit-size of the data and makes it an exact multiple of 64 bytes, and performing the per-chunk operations on that final chunk, or chunks.

The hash algorithm of the described method keeps a running sum over the various packets or chunks of data in the form of a number of independent hashes, instead of waiting and computing a single hash representing the whole file. It also enables a re-start without having to store state beyond the data in the waiting packages.

The target receives messages in the form of chunks of file data generated in this way, possibly from multiple sources, and possibly out of order. Every message contains one or more file entries. Each file entry can be a complete file, or a part of a file. The message header includes the following data.

Each has a file name.
Each complete file, or first part of an incomplete file, has:
The size of the file part and where it is located in the message.
The hash for the data in the file part.
Each subsequent part of an incomplete file (including the completing part) contains:
The size of the file part and where it is located in the message.
The hash of all data sent for this file including this file part,
The amount of data sent for this file prior to this part.
The hash for all data sent in previous parts of this file prior to this file part.

Figure 3A:
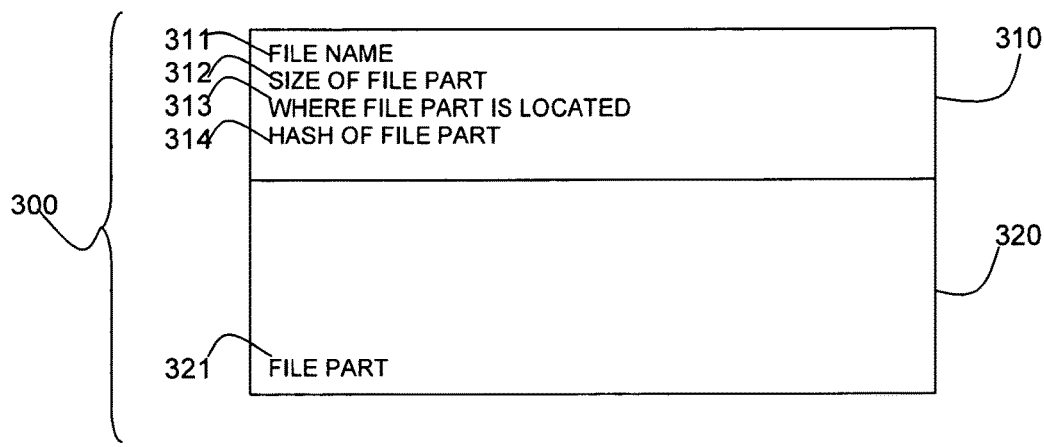
FIGS. 3A and 3B are diagrams of a message transferring a file part in accordance with the present invention.
Figure 3B:
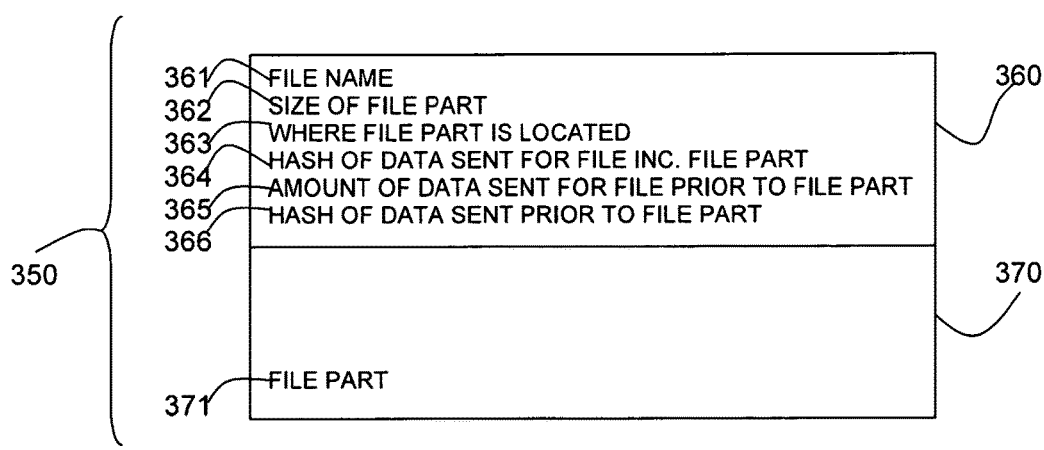

Referring to FIGS. 3A and 3B representations of the messages in which a file part is sent are shown. FIG. 3A shows a message 300 for a first file part 321 of data in a file. The message 300 includes a message header 310 and message payload 320 which includes the file part 321. The message header 310 includes the file name 311, the size 312 of the file part, and where it is located 313 in the message, and the hash 314 of the file part 321.

FIG. 3B shows a message for 350 for one or more subsequent file parts 371 of data in a file. The message 350 includes a message header 360 and message payload 370 which includes one or more file parts 371. The message header 360 includes the file name 361, the size 362 of the file part 371, where the file part 371 is located 363 in the message, the hash 364 of the data sent for this file including the file part 371, the amount 365 of data sent for this file prior to this file part 371, and the hash 366 for all data sent in previous parts of this file prior to this file part 371.

The message payload 320, 370 is filled from the end of free space available in the message. This means the space allocated for headers can grow at the head of the message, and file data grows from the tail. This allows a single fixed size buffer to be used without moving data within the message as file parts are added This allows the target to ensure processing of messages in a valid order, and non-repudiation of data. It is likely that target would keep in-memory state for efficiency, although no persisted state is required.

Using a single message and the target file in the file system, it can be determined whether a file part contained in the message applies to that file:
The size of the file is equal to or greater than, the size prior to this file part (this size is contained in the message), and less than the size after adding the size of this file part.
The hash matches the hash of the data contained in the file up to the size prior to this file part.

If both apply, the file part contained in the message can be appended to the file on the file system. The file may need to be first truncated to the correct size prior to this file part, in the case when an I/O error occurred in a previous attempt to write this file part and the message was rolled back onto the queue.

Referring to FIG. 4, a flow diagram 400 shows an example embodiment of the described method.

When sending a set of files, the following actions are performed by the source in a loop until all files have been sent. The flow diagram 400 starts 401 by selecting a first file to send 402.

A new message is created 403. The message has a fixed size determined by the messaging infrastructure being used.

The size of the message payload space available in a message is calculated 404. This is calculated by working out the size of the headers including headers for a new file chunk. The size of the headers includes either one or two hashes. The header also includes the file name, the number of bytes contained in this file part, and the number of bytes sent prior to this part of this file, as well as any other implementation specific details.

It is then determined 405 if the remaining part of the file fits into the message payload space. If so, then the chunk size is set to the size of the remaining file part 406. If the remaining part of the file does not fit into the message payload space, then it is determined 407 the number of set sized portions of the file (for example, 64 byte sized portions) which will fit into the remaining space in the message payload, the chunk size is set to this size. The chunk must be a multiple of a set sized portion for the chosen algorithm to perform. For example, the MD5 algorithm is applied to chunks of multiples of 64 bytes.

For the first part of a file addition to an existing message, no set sized portions may fit into the remaining space 408. In this case, the method performs steps 409 to write the headers to the beginning of the message and performs step 410 to send the message (without adding anything for this file) and returns to step 403.

For each chunk being sent, an iteration of the hashing algorithm is performed (for example, the MD5 algorithm) and the values are kept of the state variables at the end of the last complete chunk. If this is the first chunk for this file, the starting state variables are the constants defined in the algorithm. Otherwise, the starting state variables are those saved from performing this step on the previous chunk of this file.

Therefore, it is determined 411 if it is the first chunk for this file. If it is not the first chunk, the saved hash which summarises the file up to the end of the previous chunk, is added 412 to the header for this chunk. The saved hashing algorithm state is used 413. If it is the first chunk for this file, the hashing algorithm state is initialised 414.

Both branches, whether or not a first chunk for the file, then proceed to perform 415 an iteration of the hashing algorithm for each complete set sized portion (64 bytes in the case of MD5) for the chunk of the file data. The hashing algorithm state is saved 416 and the hashing algorithm is finalized 417.

In the example of the MD5 algorithm, this includes adding padding and any remaining file data (for the last chunk of a file where the size may not be a multiple of 64). It must be ensured that the saved state variables are not overwritten. This produces an MD5 message digest of all data sent for this file up to the end of the data contained in this part.

The resulting hash is saved 418. This summarises the file up to an including this file chunk. This is added to the header for this file chunk. The file chunk itself is written 419 to the free space in the message payload.

The file part is written at the end of free space available in the message. This means the space allocated for headers can grow at the head of the message, and file data grows from the tail. This allows a single fixed size buffer to be used without moving data within the message as file parts are added.

It is then determined 420 if there are any remaining bytes in the file, hence this is not the last part of this file to be sent. If so, the headers are written 409 to the beginning of the message for this message and the message is sent 410 and the method loops to create the next new message 403 in which the next or remaining part of the file will be sent.

If this is not the last part of this file to be sent, then the current algorithm sum is kept, and it is sent with the headers for the next part of the file in addition to the algorithm sum calculated for the end of that file part.

If no bytes remain for this file, it is determined if there are more files to send 421. If so, the next file is selected 422 and the method loops to step 404 to see if there is any remaining space in the message payload for this message.

If there are no more files to send, the headers are written 423 to the beginning of the message and the message is sent 424 and the method finishes 425.

The headers may not fill the maximum allocated size, so the message may shrink slightly, or need padding between the header and beginning of the message data depending on the implementation.

Referring to FIG. 5, a computer system 500 is shown on which the present invention may be implemented. A computer system 500 has a central processing unit 501 with primary storage in the form of memory 502 (RAM and ROM). The memory 502 stores program information and data acted on or created by the programs. The program information includes the operating system code for the computer system 500 and application code for applications running on the computer system 500. Secondary storage includes optical disk storage 503 and magnetic disk storage 504. Data and program information can also be stored and accessed from the secondary storage.

The computer system 500 includes a network connection means 505 for interfacing the computer system 500 to a network such as a local area network (LAN) or the Internet. The computer system 500 may also have other external source communication means such as a fax modem or telephone connection.

The central processing unit 501 includes inputs in the form of, as examples, a keyboard 506, a mouse 507, voice input 508, and a scanner 509 for inputting text, images, graphics or the like. Outputs from the central processing unit 500 may include a display means 510, a printer 511, sound output 512, video output 513, etc.

In a distributed system, a computer system 500 as shown in FIG. 5 may be connected via a network connection 505 to a server on which applications may be run remotely from the central processing unit 501 which is then referred to as a client system.

Applications which may run on the computer systems from a storage means or via a network connection may include word processing programs, Internet access programs including search engines for searching the World Wide Web, other text indexing and retrieving programs for databases, machine translation programs for translating foreign language documents, optical character recognition programs for recognizing characters from scanned documents, etc.

In one embodiment, the described method may be used installing media, as well as downloading fix packs and refresh packs for existing media.

The describe method provides a mechanism to transfer files in messages of closely equal size, possibly containing many separate files, or parts of files. Parts of files arriving in separate messages are written to the target file system as they arrive.

The described method does not require any state data to be persisted between processing of individual messages, other than the current contents of the file system. It can also cope with out of order delivery of messages and restart of the target between message arrivals. The mechanism ensures non-repudiation of the resulting files using a message digest algorithm.

The way the message digest algorithm is used within the mechanism is efficient; requiring only one compete message digest to be built by the source and target machines while data is already in memory (being placed in a message, or written from a message into a file).

The use of message digest algorithm is also central to allowing the file system to be the only source of state for the mechanism.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A system for file transfer over a messaging infrastructure, comprising:
   a source for sending a file, including:
   means for dividing the file into multiple portions including a first portion and at least one subsequent portion;
   means for creating a message including a multiplicity of headers and payloads with an individual one of the headers and an individual one of the payloads for each of the multiple portions of the file, each of the payloads including a corresponding one of the multiple portions and being associated with a corresponding one of the message headers, wherein the one of the headers of a message for the first portion includes a hash for the first portion included in the message for the first portion, and the one of the headers of a message for any subsequent portion includes two different hashes:
   a first hash summarizing a first state of the file up to, but not including, a current one of the portions included in the message for the subsequent portion, the first state indicating a state of the file that is required in order to add the current one of the portions to the file when recreating the file at a target computing device;

a second hash summarizing a second state of the file up to and including a current one of the portions included in the message for the subsequent portion, the second state indicating a state of a recreated file after having added the current portion to the file at the target computing device; and means for sending each created message to the target computing device by way of a message queue, wherein each of the payloads is filled from an end of free space available in the message so that space allocated for each of the headers is able to grow at a head of the message, while file data grows from a tail of the message allowing a single fixed size buffer to be used without moving data within the message as file portions are added.

2. The system as claimed in claim 1, including means for comparing the second hash to a first hash of a subsequent file portion at the target.

3. The system as claimed in claim 2, including storing the received file data at the target and means for recreating the second hash from stored file data for comparing to the first hash of a subsequent file portion.

4. The system as claimed in claim 1, including:
means for generating a message including a header section and a payload section, wherein the payload section includes one or more file portions, and sending the first and second hashes in the header section of the message.

5. The system as claimed in claim 4, wherein the message includes the file size, the file name, the size of the file part and where it is located in the message, and the amount of data sent previously for a given file.

6. The system as claimed in claim 1, wherein the means for dividing the file into multiple portions, divides the file into portions to fit in the payload section of the message once the size of the header section has been determined.

7. The system as claimed in claim 1, wherein the target includes means for determining if a file portion belongs to a given file by determining if the first hash matches the second hash of the previous file portion.

8. The system as claimed in claim 7, wherein the means for determining if the file portion belongs to a given file also includes means for determining if the file size is equal to or greater than the size prior to the current portion and less than the size after adding the current portion.

9. A non-transitory computer readable storage medium storing a computer program product for a source transferring a file over a messaging infrastructure, comprising computer readable program code means for performing the steps of:
dividing a file into multiple portions including a first portion and at least one subsequent portion;
creating a message including a multiplicity of headers and payloads with an individual one of the headers and an individual one of the payloads for each of the multiple portions of the file, each of the payloads including a corresponding one of the multiple portions and being associated with a corresponding one of the message headers, wherein the one of the headers of a message for the first portion includes a hash for the first portion included in the message for the first portion, and the one of the headers of a message for any subsequent portion includes two different hashes:

a first hash summarizing a first state of the file up to, but not including, a current one of the portions included in the message for the subsequent portion, the first state indicating a state of the file that is required in order to add the current one of the portions to the file when recreating the file at a target computing device;

a second hash summarizing a second state of the file up to and including a current one of the portions included in the message for the subsequent portion, the second state indicating a state of a recreated file after having added the current portion to the file at the target computing device; and sending each created message to the target computing device by way of a message queue, wherein each of the payloads is filled from an end of free space available in the message so that space allocated for each of the headers is able to grow at a head of the message, while file data grows from a tail of the message allowing a single fixed size buffer to be used without moving data within the message as file portions are added.

10. The computer program product as claimed in claim 9, including comparing the second hash to a first hash of a subsequent file portion at a target.

11. The computer program product as claimed in claim 10, including recreating the second hash from stored file data at the target.

12. The computer program product as claimed in claim 9, including:
generating a message including a header section and a payload section, wherein the payload section includes one or more file portions; and
sending the first and second hashes in the header section of the message.

13. The computer program product as claimed in claim 12, wherein a message includes file portions for different files.

14. The computer program product as claimed in claim 12, wherein the message includes the file name, the size of the file part and where it is located in the message, and the amount of data sent previously for a given file.

15. The computer program product as claimed in claim 9, wherein dividing the file into multiple portions, divides the file into portions to fit in the payload section of the message once the size of the header section has been determined.

16. The computer program product as claimed in claim 9, including:
sending the size of the file with the file portion.

17. The computer program product as claimed in claim 9, including:
receiving a file portion in a message; and
determining if a file portion belongs to a given file by determining if the first hash matches the second hash of the previous file portion.

18. The computer program product as claimed in claim 9, wherein generating the first and second hashes uses a hashing algorithm which performs operations against contiguous portions of a file in order, and which finalizes the calculations of a hash for a complete file without referring to previously stored portions of a file.

19. The computer program product as claimed in claim 18, wherein the hashing algorithm is the MD5 algorithm.

* * * * *